(12) United States Patent
Hu (10) Patent No.: US 6,641,295 B1
(45) Date of Patent: Nov. 4, 2003

(54) FOG LIGHT DEVICE

(75) Inventor: Wen-Sung Hu, Tainan (TW)

(73) Assignee: Wendell Ng-Sell-Quan, Ontario (CA)

( * ) Notice: Subject to any disclaimer, the term of this patent is extended or adjusted under 35 U.S.C. 154(b) by 0 days.

(21) Appl. No.: 10/155,609

(22) Filed: May 24, 2002

(51) Int. Cl.[7] .................................................. F21S 8/10
(52) U.S. Cl. .................... 362/545; 362/544; 362/540
(58) Field of Search ........................ 362/26, 487, 505, 362/506, 540, 543, 544, 545, 546, 548, 549, 236, 235, 507, 800, 242

(56) References Cited

U.S. PATENT DOCUMENTS

| | | | | |
|---|---|---|---|---|
| 2,320,917 A | * | 6/1943 | Ely | 362/194 |
| 2,668,902 A | * | 2/1954 | Fisher | 362/487 |
| 3,759,084 A | * | 9/1973 | Plewka | 362/235 |
| 5,276,594 A | * | 1/1994 | Burkett et al. | 362/540 |
| 6,471,368 B1 | * | 10/2002 | Lin | 362/545 |

* cited by examiner

*Primary Examiner*—Y. My Quach-Lee
(74) *Attorney, Agent, or Firm*—Alan D. Kamrath; Rider Bennett, LLP.

(57) ABSTRACT

A fog light device has a base casing, a lampholder, a transparent lampshade, a photoconduction plate, an outer casing, a main bulb, and at least an auxiliary bulb. The base casing has a hollow interior to receive at least a positioning seat. The auxiliary bulb is connected to the positioning seat. The main bulb is inserted in the center through hole of the lampholder. The transparent lampshade is inserted in the annular recess of the lampholder. The photoconduction plate is inserted in the annular channel of the lampholder. The photoconduction plate has a first taper end and a second taper end to receive a light emitted by the auxiliary bulb.

8 Claims, 8 Drawing Sheets

FIG.5
(RRIOR ART)

FOG LIGHT DEVICE

BACKGROUND OF THE INVENTION

The present invention relates to a fog light device. More particularly, the present invention relates to a fog light device which is disposed on a vehicle.

Figure 5:
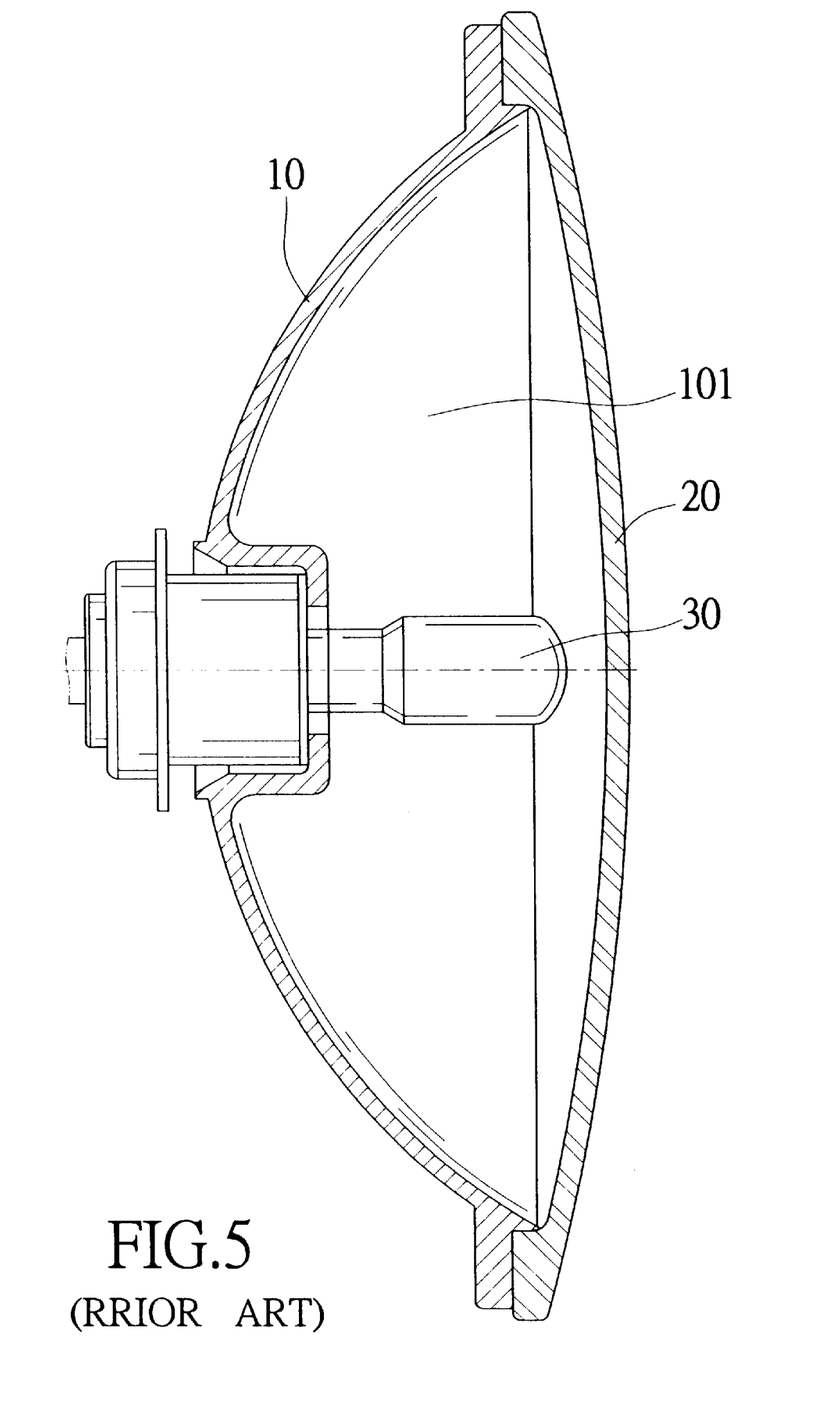
FIG. 5 is a sectional view of a conventional fog light device of the prior art.
Figure 11:
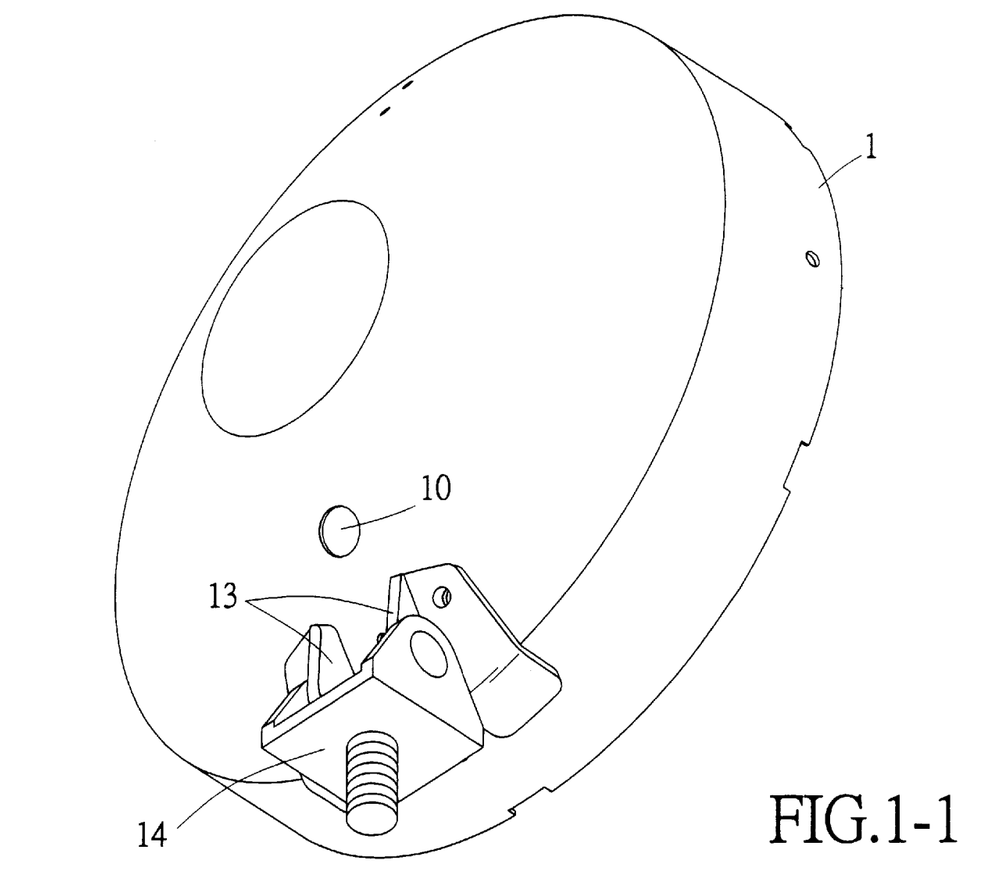

Referring to FIG. 5, a conventional fog light device has a rear lampholder 10, a front lampshade 20 engaging with the rear lampholder 10, the rear lampholder 10 having an inner reflection mirror 101, and a bulb 30 inserted in a center of the rear lampholder 10. However, the conventional fog light device has a single bulb to perform a single illuminating function only.

Another conventional fog light device has a rear lampholder, a front lampshade engaging with the rear lampholder, the rear lampholder having an inner reflection mirror, a main bulb inserted in a center of the rear lampholder, and an auxiliary bulb inserted in the rear lampholder. However, the main bulb and the auxiliary bulb perform two illuminating functions only. Since the auxiliary bulb is inserted in the rear lampholder, a hole should be formed on the rear lampholder in order to receive the auxiliary bulb. Therefore, the inner reflection mirror cannot focus light effectively. Since the auxiliary bulb is inserted in the rear lampholder, an aesthetic feeling of the auxiliary bulb is ugly.

SUMMARY OF THE INVENTION

An object of the present invention is to provide a fog light device which has a main bulb and an auxiliary bulb to perform three illuminating functions. When the main bulb emits light, an inner reflection mirror of a lampholder focuses the light effectively. When the auxiliary bulb emits light, the light enters a photoconduction plate through a first taper end and a second taper end of the photoconduction plate. When the main bulb and the auxiliary bulb emit light, two kinds of light are produced.

Another object of the present invention is to provide a fog light device which has a colorful photoconduction plate to produce a colorful light.

BRIEF DESCRIPTION OF THE DRAWINGS

FIG. 1—1 is a perspective view of an inner casing of a preferred embodiment in accordance with the present invention;

FIGS. 1–2 is a schematic view illustrating a main bulb is inserted in a lampholder of a preferred embodiment in accordance with the present invention;

FIG. 3-1 is a front elevational view of a U-shaped rack and an inner casing of a preferred embodiment in accordance with the present invention;

DETAILED DESCRIPTION OF THE INVENTION

Referring to FIGS. 1 to 4, a fog light device comprises a base casing 1, a lampholder 2 disposed in a front portion of the base casing 1, a transparent lampshade 3, a photoconduction plate 4, an outer casing 5, a main bulb 22, and two auxiliary bulbs 12.

Figure 1:
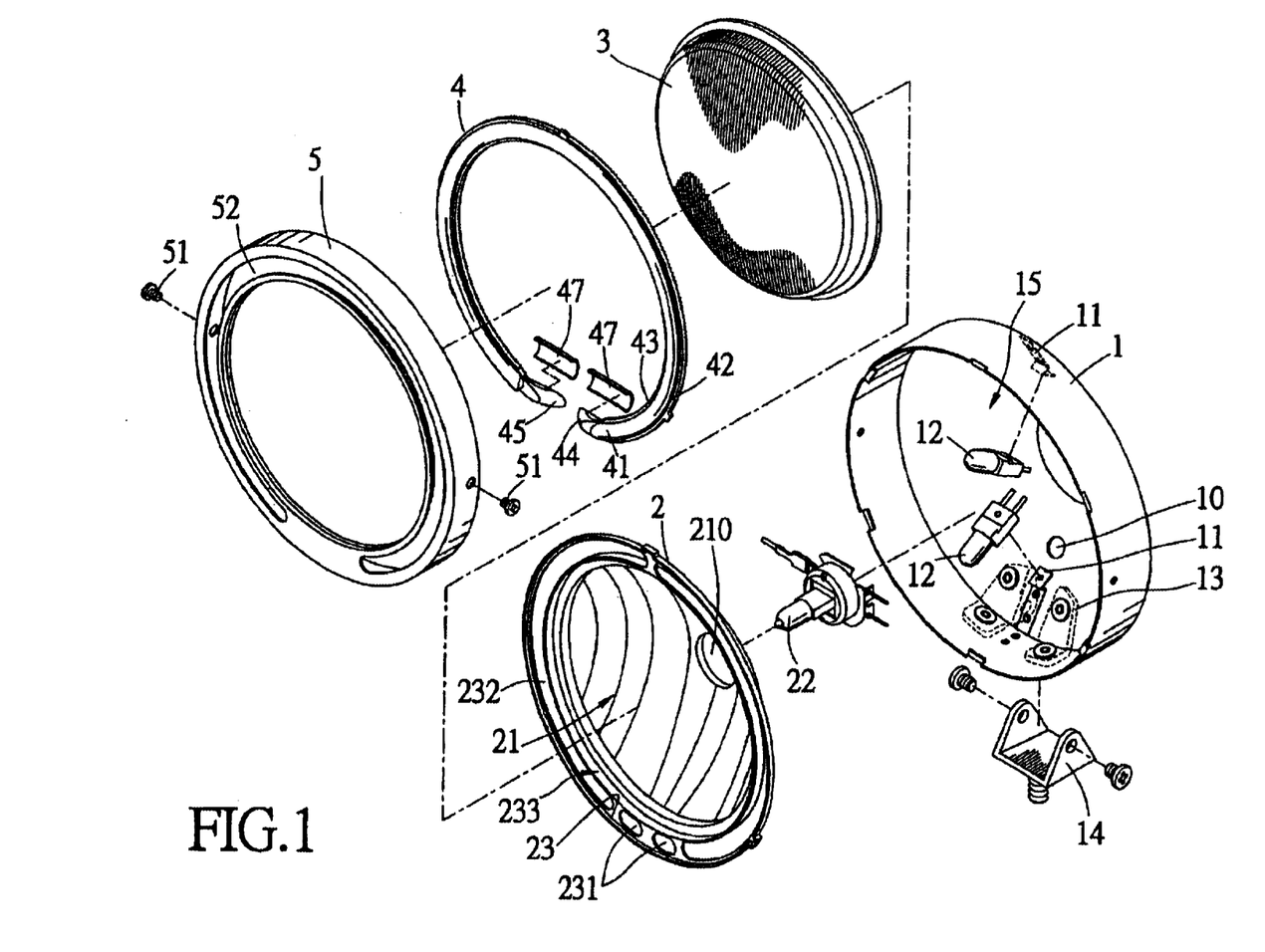
FIG. 1 is a perspective exploded view of a fog light device of a preferred embodiment in accordance with the present invention.
Figure 2:
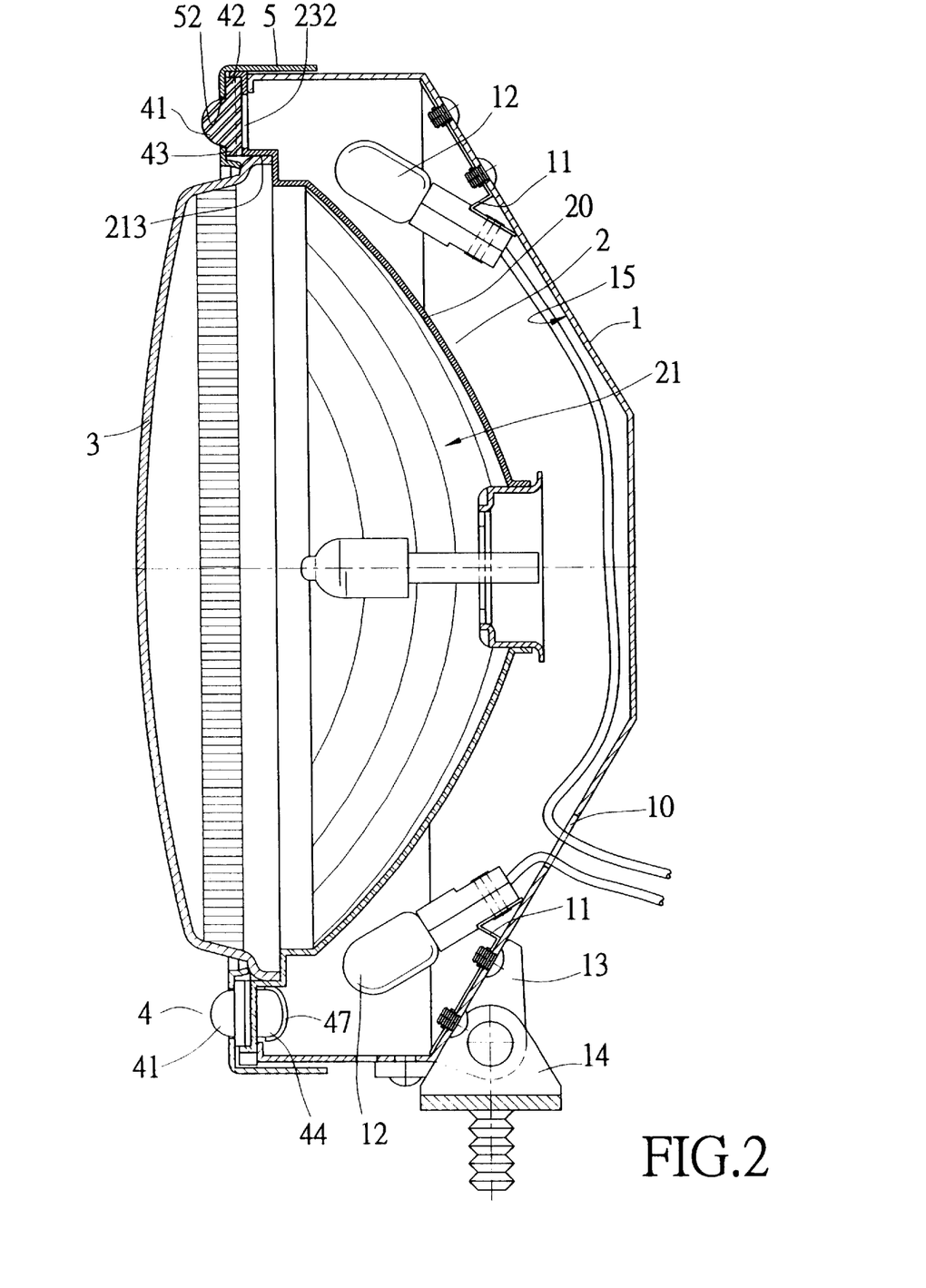
FIG. 2 is a sectional assembly view of a fog light device of a preferred embodiment in accordance with the present invention.
Figure 3:
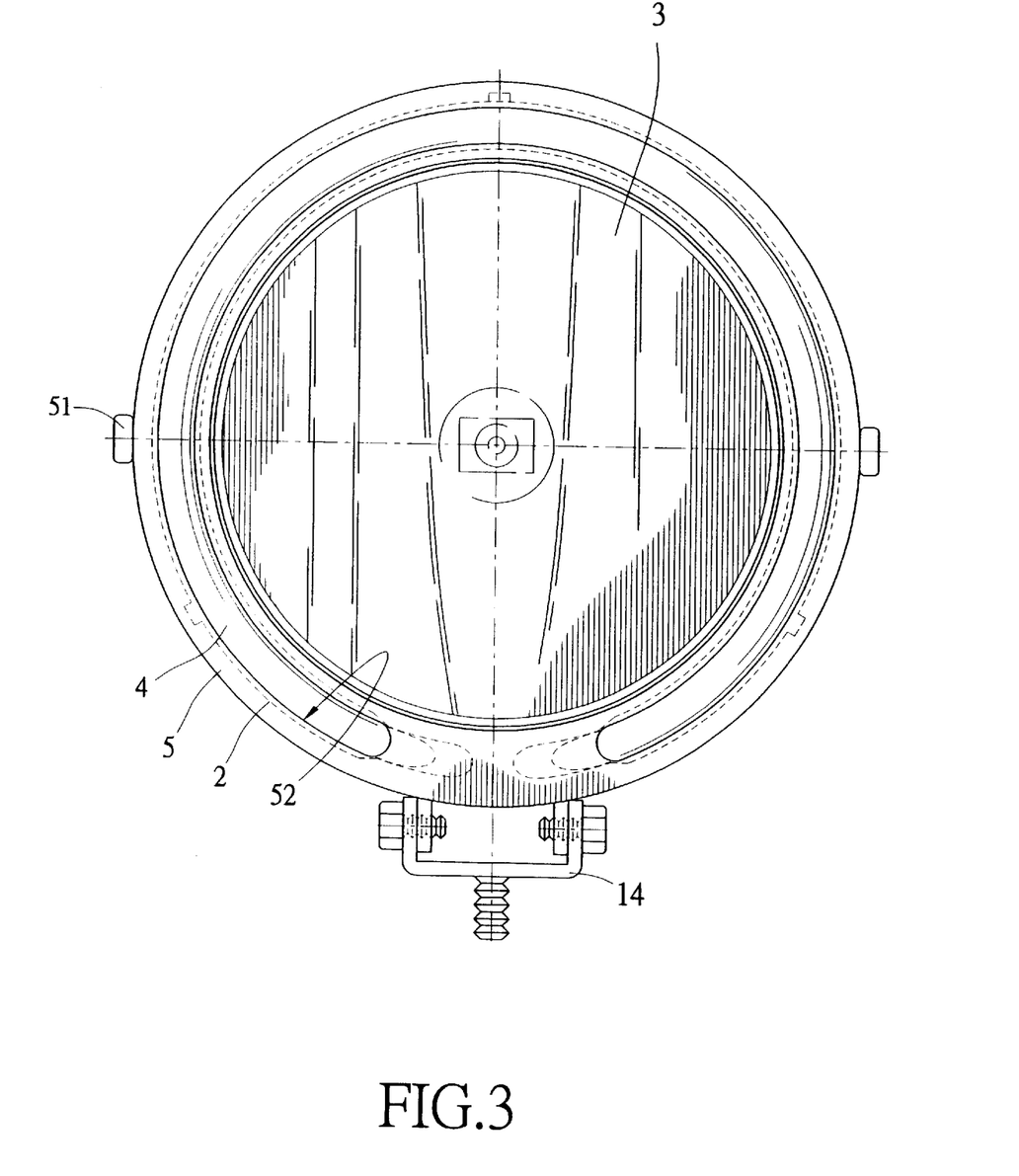
FIG. 3 is a front elevational view of a base rack and an inner casing of a preferred embodiment in accordance with the present invention.

The base casing 1 has a hollow interior 15 to receive two positioning seats 11, and a round aperture 10 to receive wires (not shown in the figures).

Each of the two auxiliary bulbs 12 is connected to the respective positioning seat 11. A pair of connecting seats 13 are disposed on a bottom of the base casing 1. A base rack 14 engages with the connecting seats 13.

The lampholder 2 has a bowl-shaped shell 20, an inner interior of the bowl-shaped shell 20 forming an inner reflection mirror 21, a center through hole 210 formed on the bowl-shaped shell 20 to receive the main bulb 22, an annular channel 23 formed on a front edge of the lampholder 2, an annular recess 233 adjacent to the annular channel 23, a plurality of arc-shaped slots 232 formed on the annular channel 23, and a plurality of oblong through holes 231 formed on a bottom of the annular channel 23.

Figure 12:
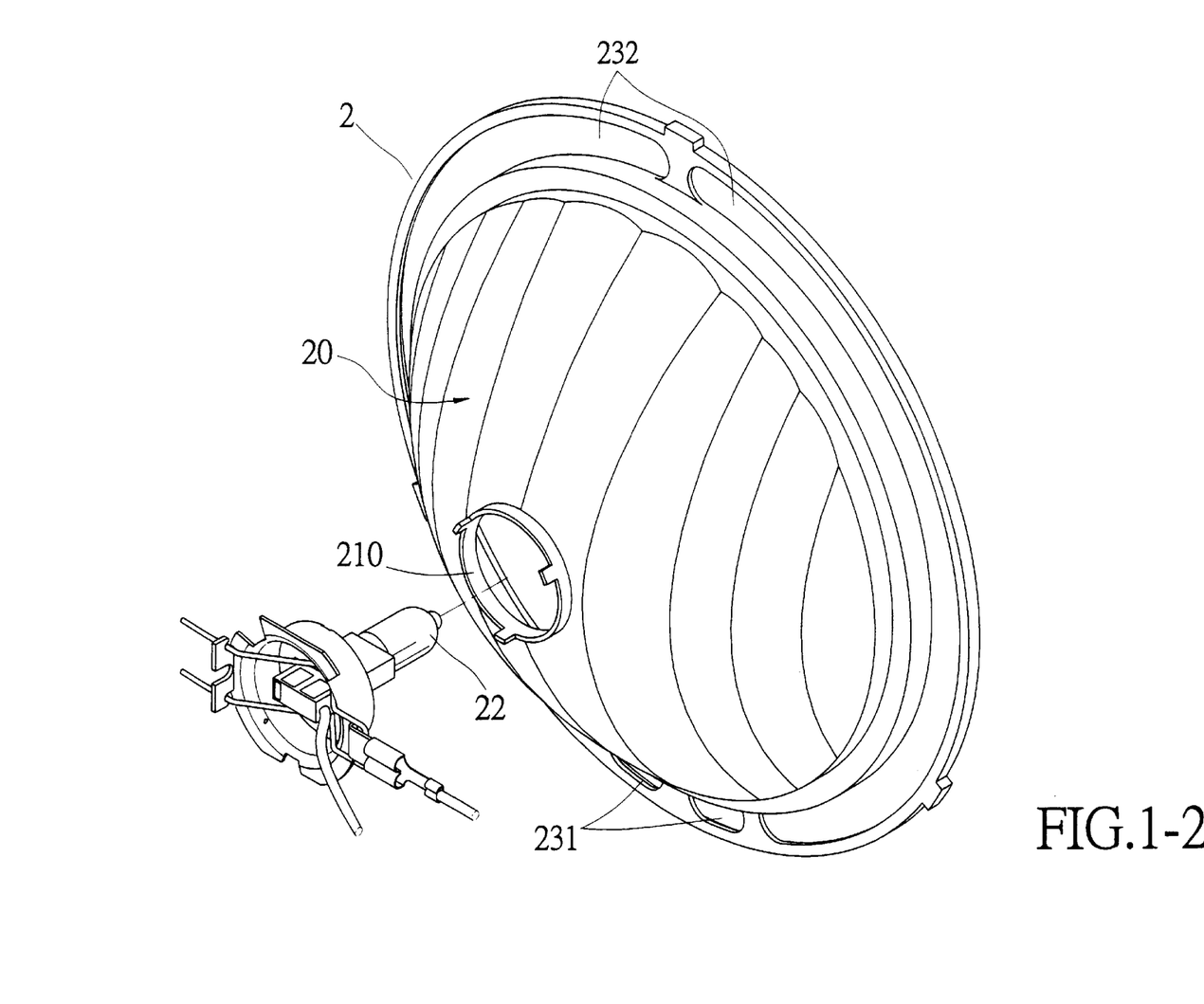

The main bulb 22 is inserted in the center through hole 210 of the lampholder 2.

The transparent lampshade 3 is inserted in the annular recess 233 of the lampholder 2.

The photoconduction plate 4 is inserted in the annular channel 23 of the lampholder 2.

The photoconduction plate 4 is made of a transparent material such as glass or a polycarbonate (PC).

Figure 4:
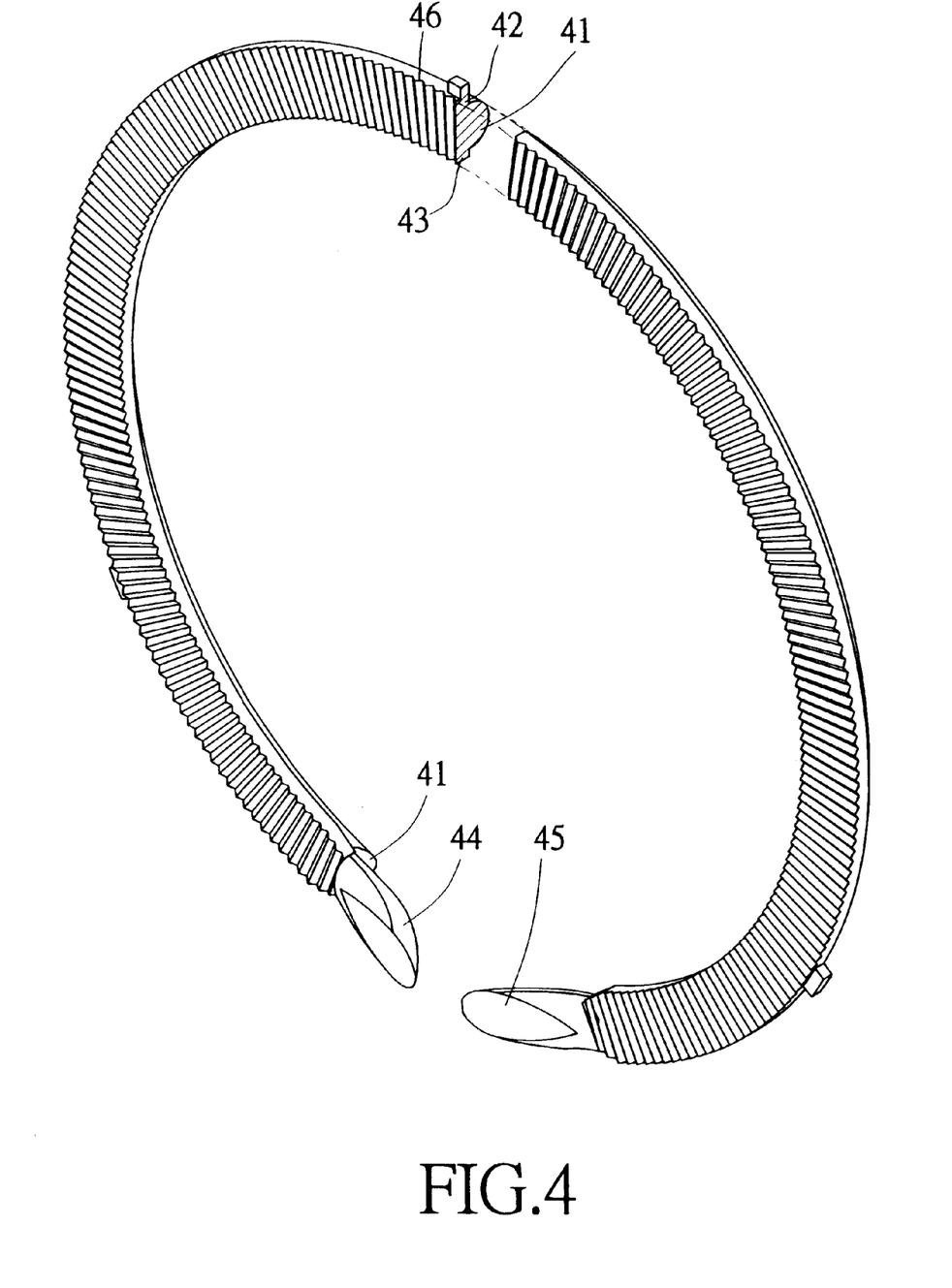
FIG. 4 is a perspective view of a C-shaped photoconduction plate of a preferred embodiment in accordance with the present invention.

The photoconduction plate 4 has a convex face 41 formed on a front face of the photoconduction plate 4, an outer flange 42 formed on an outer edge of the convex face 41, an inner flange 43 formed on an inner edge of the convex face 41, a first taper end 44, a second taper end 45, and a serrated face 46 formed on a rear face of the photoconduction plate 4.

The outer casing 5 has a C-shaped slot 52 to receive the convex face 41 of the photoconduction plate 4.

The outer casing 5 encloses a front edge of the lampholder 2 and a front edge of the base casing 1.

Two screws 51 fasten the outer casing 5 and the lampholder 2 together.

A colorful cover 47 covers the first taper end 44 and the second taper end 45 of the photoconduction plate 4.

Figure 31:
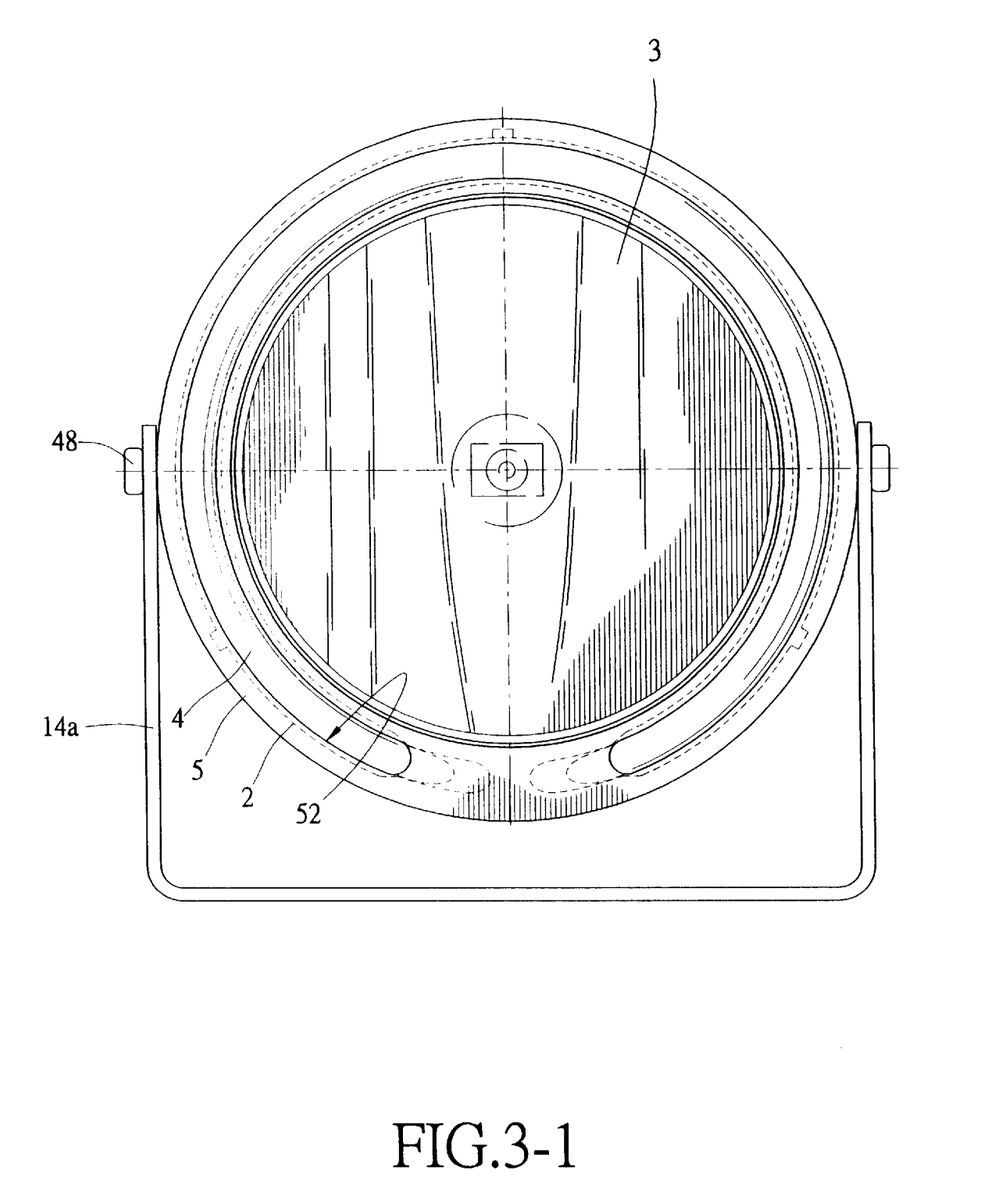

Referring to FIG. 3-1 again, a U-shaped rack 14a is connected to two sides of the base casing 1. Two bolts 48 fasten the U-shaped rack 14a and the base casing 1 together.

When the main bulb 22 emits a light, the inner reflection mirror 21 of the lampholder 2 focuses the light effectively. When the auxiliary bulbs 12 emit light, the light of one of the two auxiliary bulbs 12 enters the photoconduction plate 4 through the first taper end 44 and the second taper end 45 of the photoconduction plate 4 and the light of the other one of the two auxiliary bulbs 12 is directly projected on the photoconduction plate 4 as shown in FIG. 2. When the main bulb 22 and either one of the auxiliary bulbs 12 emit light, two kinds of light are produced. Therefore, the photoconduction plate 4 will produce an auxiliary light.

A color of the colorful cover 47 can be varied.

It is an option to provide the colorful cover 47.

A color of the auxiliary bulb 12 can be varied. A color of the photoconduction plate 4 can be varied also.

It is not necessary to provide the colorful cover 47 while a colorful auxiliary bulb 12 or a colorful photoconduction plate 4 is provided.

The present invention has the following advantages.

1. The present invention provides the fog light device which has a main bulb and an auxiliary bulb to perform three illuminating functions. When the main bulb emits light, the inner reflection mirror of the lampholder focuses the light effectively. When the auxiliary bulb emits light, the light enters the photoconduction plate through the first taper end and the second taper end of the photoconduction plate. When the main bulb and the auxiliary bulb emit light, two kinds of light are produced.
2. The auxiliary bulb is made of a tungsten or a light-emitting diode (LED).
3. Since the auxiliary bulb is disposed between the base casing and the lampholder and the photoconduction plate photoconducts the light emitted by the auxiliary bulb, the light focus function of the inner reflection mirror will not be worsened.
4. The auxiliary bulb is disposed between the base casing and the lampholder, so an aesthetic feeling of the fog light device is beautiful.
5. A color of the auxiliary bulb can be varied. A color of the photoconduction plate can be varied also.

The invention is not limited to the above embodiment but various modification thereof may be made. Further, various changes in form and detail may be made without departing from the scope of the invention.

I claim:

1. A fog light device comprises:

base casing, a lampholder disposed in a front portion of the base casing, a transparent lampshade, a photoconduction plate, an outer casing, a main bulb, and at least an auxiliary bulb, the photoconduction plate made of a transparent material, the base casing having a hollow interior to receive at least a positioning seat, the auxiliary bulb connected to the positioning seat, the lampholder having a center through hole to receive the main bulb, an annular channel formed in a front edge of the lampholder, and an annular recess adjacent to the annular channel, the main bulb inserted in the center through hole of the lampholder, the transparent lampshade inserted in the annular recess of the lampholder, the outer casing enclosing the front edge of the lampholder and a front edge of the base casing, the photoconduction plate inserted in the annular channel of the lampholder, and the photoconduction plate having a first taper end and a second taper end to receive a light emitted by the auxiliary bulb.

2. The fog light device as claimed in claim 1, wherein the photoconduction plate has a convex face formed on a front face of the photoconduction plate, an outer flange formed on an outer edge of the convex face, and an inner flange formed on an inner edge of the convex face.

3. The fog light device as claimed in claim 1, wherein a serrated face is formed on a rear face of the photoconduction plate.

4. The fog light device as claimed in claim 1, wherein the auxiliary bulb is made of one of a tungsten and a light-emitting diode.

5. The fog light device as claimed in claim 1, wherein a U-shaped rack is connected to the base casing and two bolts fasten the U-shaped rack and the base casing together.

6. The fog light device as claimed in claim 1, wherein a colorful cover covers the first taper end and the second taper end of the photoconduction plate.

7. The fog light device as claimed in claim 1, wherein the auxiliary bulb has a color.

8. The fog light device as claimed in claim 1, wherein the photoconduction plate has a color.

* * * * *